United States Patent
MacWilliams et al.

(10) Patent No.: US 10,642,377 B2
(45) Date of Patent: May 5, 2020

(54) METHOD FOR THE INTERACTION OF AN OPERATOR WITH A MODEL OF A TECHNICAL SYSTEM

(71) Applicant: SIEMENS AKTIENGESELLSCHAFT, München (DE)

(72) Inventors: Asa MacWilliams, Fürstenfeldbruck (DE); Markus Sauer, München (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 16/315,231

(22) PCT Filed: Jun. 12, 2017

(86) PCT No.: PCT/EP2017/064249
§ 371 (c)(1),
(2) Date: Jan. 4, 2019

(87) PCT Pub. No.: WO2018/007102
PCT Pub. Date: Jan. 11, 2018

(65) Prior Publication Data
US 2019/0163287 A1 May 30, 2019

(30) Foreign Application Priority Data
Jul. 5, 2016 (DE) .......... 10 2016 212 240

(51) Int. Cl.
*G06F 3/03* (2006.01)
*G06F 3/0346* (2013.01)
(Continued)

(52) U.S. Cl.
CPC ............ *G06F 3/0346* (2013.01); *G06F 3/011* (2013.01); *G06F 3/017* (2013.01);
(Continued)

(58) Field of Classification Search
CPC ........ G06F 3/011; G06F 3/017; G06F 3/0346; G06F 3/04842; G06F 3/04847; G06T 19/20
(Continued)

(56) References Cited

U.S. PATENT DOCUMENTS 5,594,469 A 1/1997 Freeman
9,211,644 B1 12/2015 Checka
(Continued)

FOREIGN PATENT DOCUMENTS

DE 102013207528 A1 10/2014
EP 2908215 A1 8/2015
(Continued)

OTHER PUBLICATIONS

German Office Action for German Application No. 10 2016 212 240.1 dated Mar. 27, 2017.
(Continued)

*Primary Examiner* — Tony O Davis
(74) *Attorney, Agent, or Firm* — Lempia Summerfield Katz LLC

(57) ABSTRACT

The method provides detection of a plurality of spatial parameters which are assigned to one or both forearms of an operator. Processing markers generated from the spatial parameters are visualized in a virtual scene. The operator activates processing markers and carries out processing operations by changing the position of his or her forearm(s). After the processing operations are complete, the operator deactivates the assignment between processing marker and manipulation marker by rotating a forearm. A particular advantage of the method disclosed herein compared with conventional methods lies in the activation and deactivation using the rotation of a forearm of the operator. A rotation of the wrist may be carried about largely independently of the
(Continued)

direction in which the forearm is pointing. In this manner, the operator may use shoulder rotation and elbow flexion to change the position of the forearm in order to change spatial parameters for a processing marker, while processing operations may be deactivated and/or activated by an independent rotation of the forearm.

17 Claims, 2 Drawing Sheets

(51) Int. Cl.
    *G06F 3/0484*  (2013.01)
    *G06F 3/01*  (2006.01)
    *G06T 19/20*  (2011.01)

(52) U.S. Cl.
    CPC ...... *G06F 3/04842* (2013.01); *G06F 3/04847* (2013.01); *G06T 19/20* (2013.01)

(58) Field of Classification Search
    USPC ........................................ 345/156, 158, 690
    See application file for complete search history.

(56) References Cited

U.S. PATENT DOCUMENTS

| | | |
|---|---|---|
| 2008/0036737 A1 | 2/2008 | Hernandez-Rebollar |
| 2011/0109617 A1* | 5/2011 | Snook ..................... G06T 17/00 345/419 |
| 2011/0148755 A1 | 6/2011 | Lee |
| 2013/0265229 A1 | 10/2013 | Forutanpour |
| 2013/0283202 A1 | 10/2013 | Zhou |
| 2013/0342572 A1 | 12/2013 | Poulos |
| 2014/0198034 A1 | 7/2014 | Bailey |
| 2014/0201674 A1 | 7/2014 | Holz |
| 2015/0261659 A1 | 9/2015 | Bader |
| 2016/0041624 A1 | 2/2016 | Spiessl |
| 2016/0070439 A1 | 3/2016 | Bostick |
| 2016/0125603 A1* | 5/2016 | Tanji ..................... A61B 34/10 382/131 |
| 2016/0158937 A1* | 6/2016 | Kamoi ................... B25J 9/1697 700/259 |
| 2018/0228430 A1* | 8/2018 | Perez Marcos ...... A61B 5/0077 |
| 2019/0294258 A1* | 9/2019 | Forlines ................ G06F 3/0234 |

FOREIGN PATENT DOCUMENTS

| | | |
|---|---|---|
| WO | WO2015060856 A1 | 4/2015 |
| WO | WO2015081568 A1 | 6/2015 |
| WO | WO2016001089 A1 | 1/2016 |

OTHER PUBLICATIONS

PCT International Search Report and Written Opinion of International Searching Authority dated Aug. 22, 2017 corresponding to PCT International Application No. PCT/EP20171064249 filed on Jun. 12, 2017.

* cited by examiner

METHOD FOR THE INTERACTION OF AN OPERATOR WITH A MODEL OF A TECHNICAL SYSTEM

The present patent document is a § 371 nationalization of PCT Application Serial No. PCT/EP2017/064249, filed Jun. 12, 2017, designating the United States, which is hereby incorporated by reference, and this patent document also claims the benefit of German Patent Application No. DE 10 2016 212 240.1, filed Jul. 5, 2016, which is also hereby incorporated by reference.

TECHNICAL FIELD

The disclosure relates to a method for the interaction of an operator with a model of a technical system.

Such a method is used, for example, in the field of automation technology, in production machines or machine tools, in diagnostic systems or service support systems as well as in operator control and maintenance of complex components, devices and systems, in particular, industrial or medical installations.

BACKGROUND

In the prior art, interaction systems are known which support an operator of technical installations using an enriched situation representation during handling of tooling operations and maintenance operations. An enriched situation illustration is also known in the specialist world as "augmented reality". In this context, a situation which may be perceived by the operator is extended or replaced with computer-generated additional information or virtual objects by insertion or superimposition.

For example, virtual action markers of an industrial robot for the purpose of collision analysis are known, which action markers superimpose a real industrial environment in the field of vision of a pair of data glasses, in order to permit the operator to carry out intuitive checking as to whether the industrial robot may be positioned by its dimensions or by its action radius at a predefined position in the envisaged environment.

A selection of virtual objects and a retrieval of additional information requires detection of commands by the operator. In one industrial environment, known input devices such as, e.g., a keypad, touchscreen, graphic tablet, trackpad, or mouse, which are tailored to a sitting working position of an operator in an office environment, are already discounted owing to a standing working position.

A known visual detection of gestures is carried out, for example, using Microsoft Kinect, Leap Motion, or Microsoft HoloLens. One or more optical detection devices detect the posture of the operator's body in a three-dimensional fashion, for example, by applying time of flight methods or structured light projection.

In summary, presently known measures for the interaction do not take place in a contactless fashion and occur insecurely or with a use of input devices for gesture detection which is not suitable for a working situation.

SUMMARY AND DESCRIPTION

In view of the above, the present disclosure is aimed at the object of making available an interaction system with intuitive and contactless detection of processing operations, which system makes it possible to dispense with any handling of input devices.

The scope of the present disclosure is defined solely by the appended claims and is not affected to any degree by the statements within this summary. The present embodiments may obviate one or more of the drawbacks or limitations in the related art.

The method for the interaction of an operator with a model of a technical system provides a positionally correct visualization of objects of the model in a virtual scene and a positionally correct visualization of at least one manipulation marker. When an interaction system is operated, a plurality of spatial parameters are detected, which parameters are assigned to one or both forearms of the operator. One or more processing markers generated from the spatial parameters are visualized in the virtual scene. The operator activates one or more processing markers as a first processing marker or plurality of first processing markers which is/are assigned to a first manipulation marker. Subsequently, processing operations are carried out on the first manipulation marker as a function of a change in spatial parameters, which may be attributed to a change in position of a forearm which is assigned to the first processing marker. The forearm of the operator herein experiences a rotational or translatory change in position or else a combination of a translatory and a rotational change in position. After the conclusion of the processing operations, the operator initiates enabling the assignment of the first processing marker to the first manipulation marker by bringing about a change in spatial parameters which may be attributed to a rotational movement of a forearm which is assigned to the first processing marker.

A particular advantage of the disclosure in relation to conventional methods is the activation and the enabling of a processing operation by the operator.

Known conventional methods for the interaction of an operator with a model of a technical system may provide gesture control methods which solve the problem of a contactless interaction with two-dimensional or three-dimensional objects by control using a virtual mouse cursor or control which is similar to a mouse cursor input. In this context, in principle, the question arises as to how to trigger the activation and enabling of processing which takes place by a mouse click in the case of a conventional mouse control system. The mapping of this mouse click onto a contactless interaction of an operator who is in a conventional standing position is in most instances cumbersome, in particular owing to the fact that it is difficult to detect a single finger without a corresponding sensor system for gesture control detection.

The disclosure solves this problem by activation and/or enabling of a processing operation using a rotation of the operator's forearm. Such a rotational movement, (e.g., a pronation or supination of the forearm), is significantly simpler with conventional inertia sensors which are provided in the forearm region of the operator or else with optical detection of an arm rotational gesture than detection of a finger gesture.

A significant advantage of the disclosure is that biomechanical conditions of a human arm are advantageously used: an operator may bring about a rotation of the wrist joint independently of a pointing direction of the forearm. In this way, an operator may use movements of a joint, (in particular shoulder rotation and elbow flexion), for a change in position of the forearm, in order to change spatial parameters for a processing marker, while enabling and/or activation of processing operations may be brought about by rotating the forearm independently thereof.

A further advantage of the method is to be seen in the fact that the execution of the gesture control does not require any special devices. In particular, there is no need for any finger gesture detection or electromyographic detection.

In contrast to conventional gesture detection methods, the method permits fine-grained control of various and easily distinguishable parameters of a visualized model for controlling a technical system. A simple screen is sufficient for visualizing a virtual scenario of the model, that is to say various objects and associated manipulation markers.

A further advantage includes the fact that the operator merely has to use and learn a small number of gestures for controlling the interaction system. The latter include, in particular, activating, moving and enabling processing markers using a manipulation marker. The enabling of an assignment of the processing marker to a processing marker may be carried out intuitively with a rotational movement of the forearm.

A further advantage of the interaction method is that the type of operator control provides greatest possible protection against an inadvertent triggering of the enabling process. The configuration of the manipulation markers may be performed such that while controlling the processing markers with changes in position the operator does not bring about any erroneous enabling process.

According to one advantageous development there is provision that the processing operations which are carried out in the model of the technical system are converted into control operations at the technical system. This measure permits control of the technical system which goes beyond a simple simulation.

According to one advantageous development, there is provision that the manipulation marker is assigned to at least one object or at least one region of the virtual scene. An object assignment permits this object to be influenced, while region assignment permits the selection of region and/or influencing of a plurality of objects.

In order to activate the first processing marker, a spatial distance is determined between a processing marker and the at least first manipulation marker. According to a first embodiment, activating a processing marker whose spatial distance from the first manipulation marker undershoots a predefinable first threshold value takes place as a first processing marker which is assigned to the first manipulation marker. According to a second embodiment, a marker of a processing marker whose spatial distance from a first manipulation marker undershoots a predefinable first threshold value firstly takes place as a first processing marker which may be assigned to the first manipulation marker. Subsequently, activating the assignable first processing marker takes place as a first processing marker which is assigned to a first manipulation marker as a function of a change in spatial parameters which may be attributed to a rotational movement of a forearm which is assigned to the first processing marker. The change in the spatial parameters, which may be attributed to a rotational movement, is also to be understood as meaning that the operator has already rotated his forearm into an envisaged position—and has consequently already previously brought about the rotational movement—before the processing marker is brought close to the manipulation marker, with the result that in this case also—that is to say without an additional rotational movement which goes beyond the preceding one—activation of the manipulation marker takes place.

The first embodiment has the advantage of simple activation by merely causing the manipulation marker which is controlled by the forearm to approach a processing marker. The second embodiment provides, in contrast, an explicit arm rotation for the ultimate selection of the processing marker. The second embodiment is advantageous if an additional confirmation of the activation by a rotational movement is desired, in particular, for reasons of safe operator control.

According to one advantageous development, there is provision that when a second threshold value of a spatial distance between the processing marker and the first manipulation marker is undershot, feedback is output to the operator. The feedback indicates imminent activation of the processing marker to the user. This feedback may take place haptically, acoustically, or optically. Acoustic or haptic feedback may be carried out, for example, by embodying a gesture detection unit as a smart watch which may have corresponding actuators for outputting such feedback.

The second threshold value of the spatial distance may lie above the first threshold value, with the result that the feedback of imminent activation takes place before the actual activation. When the feedback is triggered, the operator may decide whether he moves the processing marker further in the direction of the manipulation marker to be activated or else—in the event of the course taken by the processing marker may not bring about activation of the approached manipulation marker—correspondingly changes the course.

DETAILED DESCRIPTION

Figure 1:
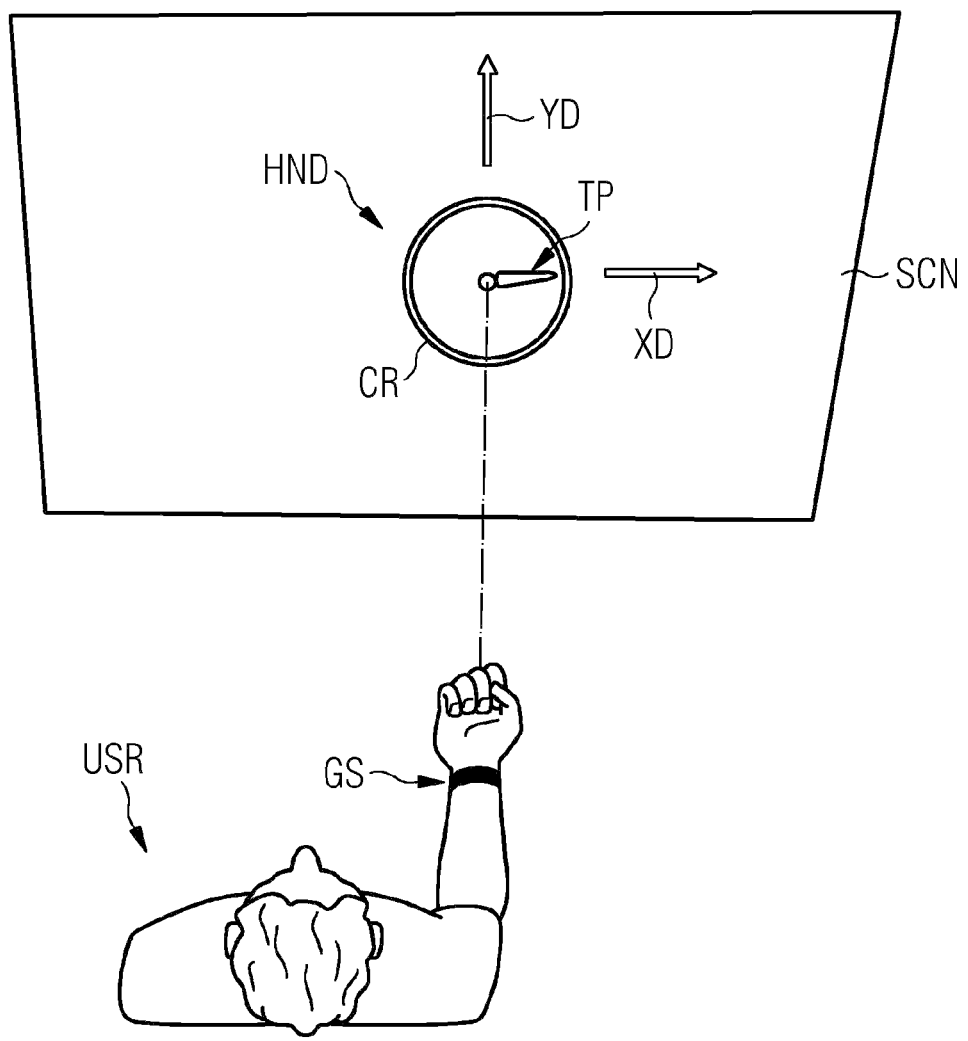
FIG. 1 depicts a schematic structural illustration of an interaction system with a controlling operator.

FIG. 1 depicts an operator USR who is illustrated in a plan view and whose gestures which are formed by one or both forearms are detected using at least one gesture detection unit GS.

In the case of the exemplary embodiment illustrated in the drawing, the gesture detection unit is designed to be worn on the human body and includes at least one gesture detection unit GS which is attached in a forearm region of the operator USR and has a plurality of inertia sensors for detecting a plurality of spatial parameters which are assigned to the forearm of the operator USR, these being, in particular, parameters which are formed by movement, rotation and/or position of the arms of the operator USR.

Alternatively, a tracking system (e.g., an optical tracking system) is used. In such an optical tracking system, infrared cameras detect the spatial parameters on the basis of at least one optical marker and pass them on to a control unit.

The spatial parameters include at least two degrees of freedom, (e.g., three degrees of freedom), at least one spatial parameter of which is assigned to a rotational movement, (that is to say a pronation or supination), of the forearm.

For example, what is referred to as a smart watch with integrated acceleration sensors, magnetic sensors and gyroscopic sensors, is used as the gesture detection unit GS. An orientation may be determined with three degrees of freedom by evaluating the sensors. Given a corresponding calibration of the sensors and an at least temporarily stationary positioning of the user USR, secure detection of three spatial parameters which are considered in more detail below is made possible: (1) an external rotation or internal rotation of the shoulder of the operator USR, in particular in order to bring about a movement of the forearm to the left/to the right; (2) bending or extension of the elbow, in particular in order to bring about an upward/downward movement of the forearm about the elbow joint; and (3) a forearm rotation, that is to say a pronation or supination of the forearm, that is to say a rotation of the forearm carried out using the wrist joint about its main axis.

In the rest of the description, for the plurality of spatial parameters which are assigned to the forearm, a triplet (sr,ef,fp) of the abovementioned parameters is continued, composed of a parameter sr for the shoulder rotation, a parameter ef for the elbow flexion ef, and also a parameter fp for the rotation of the forearm or "forearm pronation". Each spatial parameter of this triplet represents an angle in relation to a defined starting orientation, (e.g., an arm which points in the direction of north), in the horizontal direction with an upwardly directed thumb.

A visualization device SCN, embodied here as a screen, is provided within visual contact with the operator USR. Positionally correct visualization of a processing marker HND, which is visualized in this exemplary embodiment as a circular structure CR with a representation of the direction of the thumb TP, takes place on the visualization device SCN. Exemplary embodiments for the visualization device SCN also include a large screen in an operations room, a pair of data glasses or a data helmet or a "head mounted display", a projector for projecting a scenario—in particular a positionally correct projection of an anatomical image data or structure data—on to a patient's head.

According to a further embodiment, it is possible to partially dispense with a visualization device SCN by virtue of the fact that the positionally correct visualization of objects of the model in the virtual scene is not effected by virtual objects but rather by real objects, for example, in the case of a process of controlling or programming the movement of robot arms. The positionally correct visualization of manipulation markers assigned to real objects and of the processing marker would in such a case be carried out with an enriched situation representation or "augmented reality", for example, by projection of the manipulation markers onto the real objects or else into the operator's field of vision, for example with a pair of data glasses.

A control unit (not illustrated) is provided for actuating the visualization unit SCN. Recognition of the gestures which are detected by the gesture detection unit GS and processing of the interaction, to be triggered by the gestures of the operator USR, with a scenario which is represented on the visualization unit SCN, are carried out in the control unit.

For reasons of clarity, the graphically represented scenario according to FIG. 1 is limited to an illustration of the processing marker HND. The scenario in turn includes or represents a model of a technical system which the operator USR may control, configure, and operate while implementing the interaction method.

The interaction is carried out by influencing processing markers HND. Each processing marker HND is controlled or represented by the abovementioned triplet of spatial parameters. For example, a movement in the horizontal direction XD or a movement in the vertical direction YD is formed via a corresponding combination of shoulder rotation and elbow flexion. The movement in the horizontal or vertical direction XD,YD takes place intuitively by a corresponding movement of a visual projection of the operator USR in the horizontal or vertical direction XD,YD. The visual projection of the operator USR corresponds to a lengthening, represented by a dot-dash line in the drawing, of the forearm axis of the operator USR.

The processing marker HND is a visual representation of a gesture on the visualization unit SCN. This visual representation is generated by an assignment function which makes an assignment to the visual representation from the spatial parameter detected by the gesture detection unit GS. As a result of movement of the forearm, the processing marker HND moves in a corresponding way.

Figure 2:
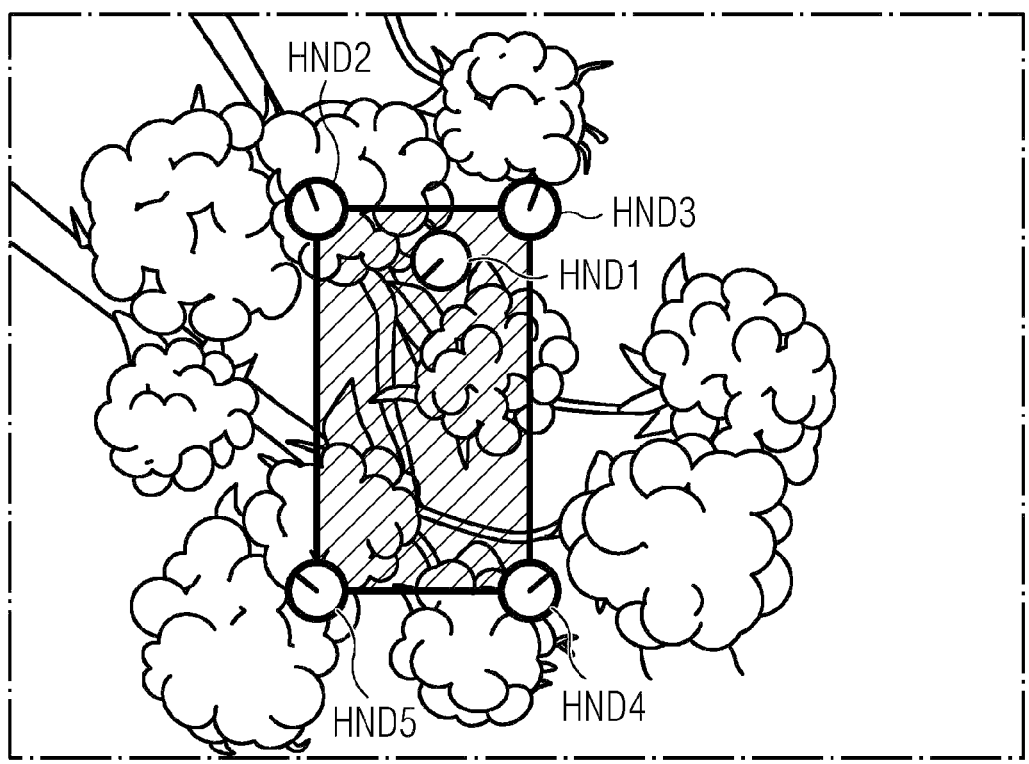
FIG. 2 depicts a schematic illustration of an interaction of an operator with a model of a technical system.

FIG. 2 illustrates a schematic illustration of a scenario composed of an exemplary representation of a plurality of berries as well as a plurality of manipulation markers HND2, HND3, HND4, HND5.

In the illustrated exemplary embodiment, the operator USR is assumed to have the task of defining a rectangular excerpt of the representation, for example, a region which includes merely one berry. In this context, the operator adjusts the rectangular excerpt himself or adjusts individual corners of this excerpt in such a way that the desired except corresponds to the excerpt illustrated in the scenario. In the exemplary embodiment, the four manipulation markers HND2, HND3, HND4, HND5 are visualized in a respective corner of this except.

The processing marker HND1 is located within the rectangular excerpt owing to the current positioning of the arm of the operator USR. According to the pointer representing the direction of the thumb of the operator USR in the inner region of the manipulation marker HND1, the position of the operator's thumb is currently directed in an 8 o'clock direction.

The operator USR may now assign the closest third manipulation marker HND3 to the processing marker HND1 and may therefore activate the manipulation marker HND3 for processing. Subsequently, the operator USR may carry out processing operations on the third manipulation marker HND3 as a function of a change in spatial parameters which may be attributed to a change in position of a forearm assigned to the processing marker HND1 (e.g., of the right forearm according to FIG. 1). In the exemplary embodiment, the operator USR may change the position of the third manipulation marker HND3 by a translatory change in position of the processing marker HND1. A translatory change in position includes a change in the first two spatial parameters of the triplet (sr,ef,fp). After the conclusion of the processing operations, the operator USR brings about enabling of the assignment of the processing marker HND1 to the third manipulation marker HND3 by changing the spatial parameters which may be attributed to a rotational movement of the forearm which is assigned to the processing marker HND1, in other words, the spatial parameter fp in the triplet (sr,ef,fp). The operator may then use the processing marker HND1 for further alternative processing operations.

After a plurality of processing operations, a confirmation operation may be provided which causes the processing operations which are carried out in the model of the technical system to be converted into control operations at the technical system. Alternatively, the conversion may occur in control operations directly or in situ.

To summarize, the method provides detecting a plurality of spatial parameters which are assigned to one or both forearms of an operator. Processing markers which are generated from the spatial parameters are visualized in a virtual scene. The operator activates processing markers and carries out processing operations by a change in position of his forearm or forearms. After the conclusion of the processing operations, the operator initiates enabling of the assignment between the processing marker and the manipulation marker by rotating a forearm.

A particular advantage of the disclosure over conventional methods is the activation and the enabling using a rotation of an operator's forearm. A rotation of the wrist joint may be brought about largely independently of a pointing direction of the forearm. In this way, the operator may use shoulder rotation and elbow flexion for a change in position of the forearm, in order to change spatial parameters for a processing marker, while enabling and/or activation of processing operations may be brought about by a rotation of the forearm independently of this.

The method according to the disclosure is particularly advantageous when medical auxiliary staff are defining an examination region which is to be delimited on a patient's body, for example for taking an X-ray. The interactions include, in particular, the selection of the examination region, also setting of examination parameters such as the intensity of the radiation and the contrast, as well as the definition and initiation of the imaging sequence.

Furthermore, a positionally correct, even chronologically staggered, projection of X-ray images which have already been recorded on the patient's body may advantageously support diagnosis by a doctor.

Although the disclosure has been illustrated and described in detail by the exemplary embodiments, the disclosure is not restricted by the disclosed examples and the person skilled in the art may derive other variations from this without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for an interaction of an operator with a model of a technical system, the method comprising:
   positionally correct visualization of objects of the model in a virtual scene;
   positionally correct visualization of at least one manipulation marker;
   detecting a plurality of spatial parameters assigned to at least one forearm of the operator, and positionally correct visualization of at least one processing marker generated from the spatial parameters, in the virtual scene;
   activating at least one processing marker as a first processing marker assigned to a first manipulation marker;
   carrying out processing operations on the first manipulation marker as a function of a change in spatial parameters configured to be attributed to a change in position of a forearm assigned to the first processing marker; and
   enabling the assignment of the first processing marker to the first manipulation marker as a function of a change in spatial parameters configured to be attributed to a rotational movement of the forearm assigned to the first processing marker.

2. The method of claim 1, wherein the processing operations carried out in the model of the technical system are converted into control operations at the technical system.

3. The method of claim 2, wherein the manipulation marker is assigned to at least one object or at least one region of the virtual scene.

4. The method of claim 2, wherein the activation of the first processing marker comprises:
   detecting a spatial distance between the at least one processing marker and the at least one manipulation marker; and
   activating a processing marker whose spatial distance from the first manipulation marker undershoots a predefinable first threshold value as the first processing marker assigned to the first manipulation marker.

5. The method of claim 4, wherein, when a second threshold value of the spatial distance between the processing marker and the first manipulation marker is undershot, feedback is output to the operator.

6. The method of claim 2, wherein the activation of the first processing marker comprises:
   detecting a spatial distance between the at least one processing marker and the at least one manipulation marker;
   marking a processing marker whose spatial distance from a first manipulation marker undershoots a predefinable first threshold value as the first processing marker configured to be assigned to the first manipulation marker; and
   activating the first processing marker as the first processing marker assigned to the first manipulation marker as the function of the change in the spatial parameters configured to be attributed to the rotational movement of the forearm assigned to the first processing marker.

7. The method of claim 6, wherein, when a second threshold value of the spatial distance between the processing marker and the first manipulation marker is undershot, feedback is output to the operator.

8. The method of claim 2, wherein the rotational movement is a pronation or supination of at least one forearm of the operator.

9. The method of claim 2, wherein the plurality of spatial parameters comprises at least:
   one parameter for a shoulder rotation of the operator;
   one parameter for an elbow flexion of the operator; and
   one parameter for a forearm rotation of the operator.

10. The method of claim 1, wherein the manipulation marker is assigned to at least one object or at least one region of the virtual scene.

11. The method of claim 1, wherein the activation of the first processing marker comprises:
    detecting a spatial distance between the at least one processing marker and the at least one manipulation marker; and
    activating a processing marker whose spatial distance from the first manipulation marker undershoots a predefinable first threshold value as the first processing marker assigned to the first manipulation marker.

12. The method of claim 11, wherein, when a second threshold value of the spatial distance between the processing marker and the first manipulation marker is undershot, feedback is output to the operator.

13. The method of claim 1, wherein the activation of the first processing marker comprises:
    detecting a spatial distance between the at least one processing marker and the at least one manipulation marker;

marking a processing marker whose spatial distance from a first manipulation marker undershoots a predefinable first threshold value as the first processing marker configured to be assigned to the first manipulation marker; and activating the first processing marker as the first processing marker assigned to the first manipulation marker as the function of the change in the spatial parameters configured to be attributed to the rotational movement of the forearm assigned to the first processing marker.

14. The method of claim 13, wherein, when a second threshold value of the spatial distance between the processing marker and the first manipulation marker is undershot, feedback is output to the operator.

15. The method of claim 1, wherein the rotational movement is a pronation or supination of at least one forearm of the operator.

16. The method of claim 1, wherein the plurality of spatial parameters comprises at least:
   one parameter for a shoulder rotation of the operator;
   one parameter for an elbow flexion of the operator; and
   one parameter for a forearm rotation of the operator.

17. The method of claim 1, wherein the method is used to define an examination region to be delimited on a body of a patient.

* * * * *